US008600040B2

(12) United States Patent
Barron et al.

(10) Patent No.: US 8,600,040 B2
(45) Date of Patent: Dec. 3, 2013

(54) APPARATUS AND METHOD FOR CONVERGENCE CONTROL

(75) Inventors: David Barron, Scottsdale, AZ (US); Suat Yeldener, Whitestone, NY (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 31 days.

(21) Appl. No.: 13/046,905

(22) Filed: Mar. 14, 2011

(65) Prior Publication Data
US 2012/0237018 A1    Sep. 20, 2012

(51) Int. Cl.
*H04M 9/08* (2006.01)
(52) U.S. Cl.
USPC .................................... 379/406.14
(58) Field of Classification Search
USPC .................................... 379/406.14
See application file for complete search history.

(56) References Cited

U.S. PATENT DOCUMENTS 6,618,481 B1 * 9/2003 Schmidt .................. 379/406.14

OTHER PUBLICATIONS

A. Mader et al, Signal Processing, 80,2000,1697-1719.*

Mohammad Asif Iqbal et al., "Novel and Efficient Download Test for Two Path Echo Canceller" Applications of Signal Processing to Audio and Acoustics, 2007 IEEE Workshop on IEEE, PI, Oct. 1, 2007, pp. 167-170, XP031167149, ISBN: 978-1-4244-1618-9, New Paltz, NY, USA.
Andreas Mader et al., "Step-size control for acoustic echo cancellation filters—an overview", Signal Processing, Sep. 1, 2000, pp. 1697-1719, vol. 80, No. 9, XP004215534, ISSN: 0165-1684, DOI: 10.1016/S0165-1684(00) 00082-7, Elsevier Science Publishers B.V., Amsterdam, NL.
International Search Report and Written Opinion dated May 10, 2012, from corresponding International Patent Application No. PCT/US2012/023157.

* cited by examiner

*Primary Examiner* — Alexander Jamal

(57) ABSTRACT

Regardless of the presence of echo or uplink speech, a microphone signal is received at a small filter and this small filter is functionally and/or physically separate from an adaptive echo canceller filter. The signal is applied to the small filter and an error signal is determined from the signal utilizing the small filter. The small filter continuously adapts the received signals. A first adaptation factor is determined based at least upon the error signal and the microphone signal according to a first signal analysis approach and a second adaptation factor is determined based at least upon the microphone signal according to a second signal analysis approach. The first adaption factor is compared to the second adaptation factor and one of the first adaptation factor or the second adaptation factor is selected based upon at least one predetermined criteria. The selected adaptation factor is applied to the echo canceller filer to control the convergence of the echo canceller filter.

17 Claims, 5 Drawing Sheets

Convergence Control Block Diagram

Convergence Control Block Diagram

APPARATUS AND METHOD FOR CONVERGENCE CONTROL

FIELD OF THE INVENTION

The invention relates generally to the echo cancellers and, more specifically, convergence control for echo cancellers.

BACKGROUND OF THE INVENTION

Different types of audio signals are received at and sent from a vehicle. For instance, downlink signals are received from some other location. Uplink signals are sent from the vehicle to some other destination. Speakers broadcast the downlink speech signals that are received, and microphones receive the speech of occupants in the vehicle for transmission. As different speech signals are transmitted and received, these signals may be reflected in the vehicle or at other places, and echoes can occur. The presence of echoes degrades the quality of speech for listeners and echo cancellers have been developed to attenuate echoes.

Acoustic echo cancellers are typically used in vehicles as part of hands-free equipment due to the close proximity of loud speakers with open microphones. However, echo cancellers can typically provide only a portion of the cancellation required in vehicular environments because of the high coupling between the loud speakers and the microphones. As a result, echo suppression approaches are used in addition to echo cancellers to increase the attenuation of echoes to an acceptable level.

As mentioned, acoustic echo cancellers are often a part of the hands free automotive environment. The amount of time required to locate and cancel an echo is typically referred to as the convergence time. Accurate convergence control is necessary to effectively remove the resulting echo. However, previous attempts at reliable convergence control in the often harsh automotive environment faced many difficulties. For instance, the control mechanism had to be able to adapt quickly to a rapidly changing acoustic environment and also had to be able to cope with high noise energy. Previous methods for controlling the convergence in vehicular environments generally failed to achieve these goals. As a result, echo continued to degrade speech signals and user satisfaction with these systems was adversely affected.

BRIEF DESCRIPTION OF THE DRAWINGS

The present invention is illustrated, by way of example and not limitation, in the accompanying figures, in which like reference numerals indicate similar elements, and in which.

Figure 1:
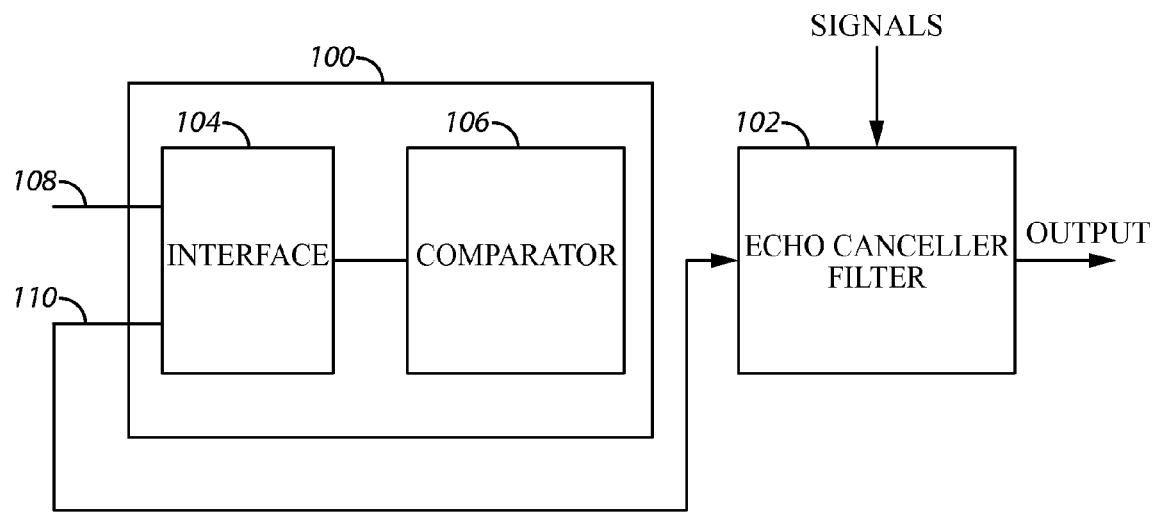
FIG. 1 comprises a block diagram of a convergence control apparatus according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

In the approaches described herein, echo control adaptation factor generation approaches are provided using a free-running echo canceller filter, the microphone error cross correlation, and a Normalized Echo Return Loss (NERL) estimate. More specifically, the approaches presented herein utilize the ability of the adaptive filter to track the echo energy. The output of a small, continuously adapting filter is used in conjunction with a Microphone Error Cross Correlation (MECC) estimate and a Normalized Echo Return Loss (NERL) estimate to generate an accurate adaptation factor for the echo cancelling filter. The approaches provided herein result in improved convergence control in cancelling echoes. As a result, user satisfaction with these systems is improved.

In many of these embodiments, convergence control for an adaptive echo canceller filter is provided and this echo canceller filter has an adjustable convergence. By "convergence" or "convergence control" and as used herein, it is meant the level of accuracy with which the filter represents the impulse response of the environment. Convergence control is the means of adjusting the adaptation factor (typically referred to as $\mu$ in the art) such that the filter's adaptation is slowed when interfering signals are present. Regardless of the presence of echo or uplink speech, a microphone signal is received at a small filter and this small filter is functionally and/or physically separate from the adaptive echo canceller filter. By "small" and as used herein, it is meant that to the length of the filter, for instance as indicated by the number of filter coefficients, which determines the length of time the filter can span. By functionally or physically separate, it is meant that a separate part (e.g., an electronic device) is used which does not share the hardware of the echo canceller filter. The signal is applied to the small filter and an error signal is determined from the signal utilizing the small filter. The small filter continuously or almost continuously adapts the received signals. As used herein, "adapt" or "adaptation" refers to the rate at which the adaptive filter updates or modifies its coefficients. A first adaptation factor is determined based at least upon the error signal and the microphone signal according to a first signal analysis approach and a second adaptation factor is determined based at least upon the microphone signal according to a second signal analysis approach. The first adaption factor is compared to the second adaptation factor and one of the first adaptation factor or the second adaptation factor is selected based upon at least one predetermined criteria. The selected adaptation factor is then applied to the echo canceller filer to control the convergence of the echo canceller filter.

In other aspects, applying the selected adaptation factor includes changing at least one filter coefficient of the adaptive echo canceller filter. In still other aspects, the first adaptation factor is selected according to a microphone error cross correlation approach and the second adaptation factor is selected according to a normalized echo return loss approach. In other aspects, a comparison is made between the first magnitude of the first adaption factor and the second magnitude of the second adaptation factor. In yet other aspects, the greater of the first magnitude or the second magnitude is selected. In still other aspects, the echo canceller filter and the small filter are disposed within a vehicle and are configured to perform a vehicle application such as providing speech to the occupants of the vehicle in hands-free applications.

In others of these embodiments, a control apparatus is configured to provide convergence control for an adaptive echo canceller filter. The echo canceller filter has an adjustable convergence. The control apparatus includes an interface and a comparator.

The interface includes an input and an output and the input is configured to receive a first adaptation factor. The first adaptation factor is determined according to a first signal analysis approach and calculated at least in part using an error signal and a microphone signal. The input is further configured to receive a second adaptation factor that is determined according to a second signal analysis approach based at least upon the microphone signal.

The comparator is coupled to the interface that is configured to compare the first adaption factor to the second adaptation factor and select one of the first adaptation factor or the second adaptation factor based upon at least one predetermined criteria. The comparator is further configured to transmit the selected adaptation factor at the output to the echo canceller filer. Application of the selected adaptation factor to the echo canceller filter is effective to control the convergence of the echo canceller filter.

In some aspects, the first adaptation factor is selected according to a microphone error cross correlation approach and the second adaptation factor is selected according to a normalized echo return loss approach. In other aspects, the comparator is configured to compare a first magnitude of the first adaption factor to a second magnitude of the second adaptation factor. In yet other aspects, the comparator is configured to select the greater of the first magnitude or the second magnitude. In still other aspects, the apparatus is disposed within a vehicle and used to perform a vehicle application. For instance, the apparatus may be used with speakers and microphones in the vehicle that are associated with hands-free applications.

In others of these embodiments, a system is configured to provide convergence control for an adaptive echo canceller filter. The system includes a small filter, an adaptive echo canceller filter, and a control unit. The small filter is configured to receive a microphone signal. The echo canceller filter has an adjustable convergence. The control unit is coupled to the small filter and the adaptive echo canceller filter. The control unit is configured to, regardless of the presence of echo or uplink speech, determine an error signal from the received signal utilizing the small filter. The small filter continuously or almost continuously adapts received signals and is further configured to determine a first adaptation factor based at least upon the error signal and the microphone signal according to a first signal analysis approach and determine a second adaptation factor based at least upon the microphone signal according to a second signal analysis approach. The control unit is still further configured to compare the first adaption factor to the second adaptation factor and select one of the first adaptation factor or the second adaptation factor based upon at least one predetermined criteria. The control unit is configured to apply the selected adaptation factor to the echo canceller filer to control the convergence of the echo canceller filter.

In other aspects, application of the selected adaptation factor is effective to change at least one filter coefficient of the adaptive echo canceller filter. In still other aspects, the first adaptation factor is selected according to a microphone error cross correlation approach and the second adaptation factor is selected according to a normalized echo return loss approach. In yet other aspects, the control unit is configured to compare a first magnitude of the first adaption factor to a second magnitude of the second adaptation factor. In other aspects, the control unit is configured to select the greater of the first magnitude or the second magnitude. In still other aspects, the echo canceller filter and the small filter are disposed within a vehicle to perform a vehicle application.

Referring now to FIG. 1, a control apparatus 100 is configured to provide convergence control for an adaptive echo canceller filter 102. The echo canceller filter 102 has an adjustable convergence. The control apparatus 100 includes an interface 104 and a comparator 106.

The interface 104 includes an input 108 and an output 110 and the input 108 is configured to receive a first adaptation factor. The first adaptation factor is determined according to a first signal analysis approach and calculated at least in part using an error signal and a microphone signal. The input 108 is further configured to receive a second adaptation factor that is determined according to a second signal analysis approach based at least upon the microphone signal.

The comparator 106 is coupled to the interface that is configured to compare the first adaption factor to the second adaptation factor and select one of the first adaptation factor or the second adaptation factor based upon at least one predetermined criteria. The comparator 106 is further configured to transmit the selected adaptation factor at the output 110 to the echo canceller filer 102. Application of the selected adaptation factor to the echo canceller filter 102 is effective to control the convergence of the echo canceller filter 102.

In some aspects, the first adaptation factor is selected according to a microphone error cross correlation approach and the second adaptation factor is selected according to a normalized echo return loss approach. In other aspects, the comparator 106 is configured to compare a first magnitude of the first adaption factor to a second magnitude of the second adaptation factor. In yet other aspects, the comparator 106 is configured to select the greater of the first magnitude or the second magnitude. In still other aspects, the apparatus 100 is disposed within a vehicle to perform a vehicle application.

Figure 2:
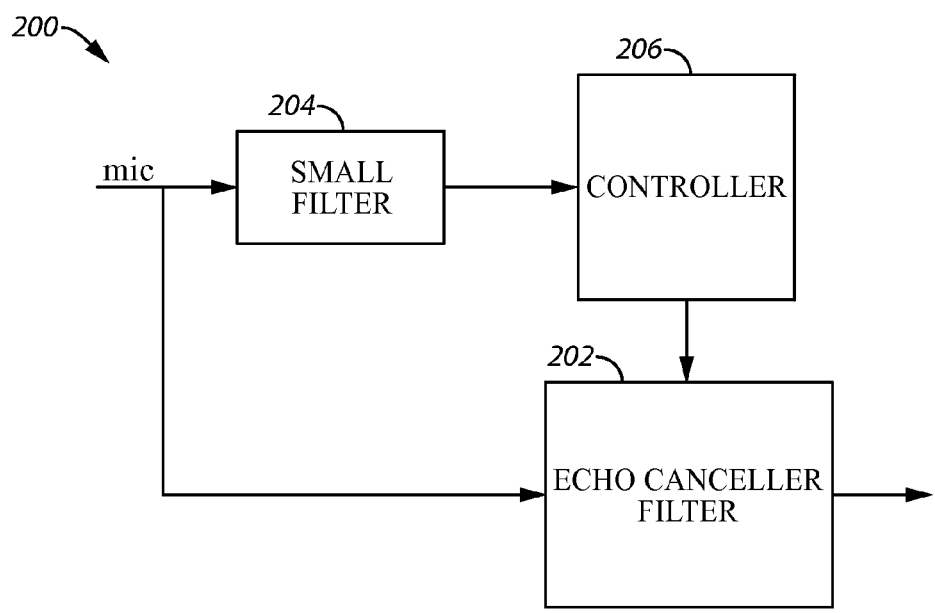
FIG. 2 comprises a block diagram of a convergence control system according to various embodiments of the present invention.

Referring now to FIG. 2, a system 200 is configured to provide convergence control for an adaptive echo canceller filter 202. The system includes a small filter 204, the adaptive echo canceller filter 202, and a control unit 206. The small filter 204 is configured to receive a microphone signal. The echo canceller filter 202 has an adjustable convergence. The control unit 206 is coupled to the small filter 204 and the adaptive echo canceller filter 202. The control unit is configured to, regardless of the presence of echo or uplink speech, determine an error signal from the received signal utilizing the small filter 204. The error signal represents the output of the small (or short) adaptive filter. This, for instance, is the microphone signal after the echo has been cancelled. The small filter 204 continuously or almost continuously adapts received signals and is further configured to determine a first adaptation factor based at least upon the error signal and the microphone signal according to a first signal analysis approach and determine a second adaptation factor based at least upon the microphone signal according to a second signal analysis approach. The control unit 206 is still further configured to compare the first adaption factor to the second adaptation factor and select one of the first adaptation factor or the second adaptation factor based upon at least one predetermined criteria. The control unit 206 is configured to apply the selected adaptation factor to the echo canceller filer 202 to control the convergence of the echo canceller filter.

In other aspects, application of the selected adaptation factor is effective to change at least one filter coefficient of the adaptive echo canceller filter 202. In still other aspects, the first adaptation factor is selected according to a microphone error cross correlation approach and the second adaptation factor is selected according to a normalized echo return loss approach. In yet other aspects, the control unit 206 is configured to compare a first magnitude of the first adaption factor to a second magnitude of the second adaptation factor. In other aspects, the control unit 206 is configured to select the greater of the first magnitude or the second magnitude. In still other aspects, the echo canceller filter 202 and the small filter 204 are disposed within a vehicle to perform a vehicle application.

Figure 3:
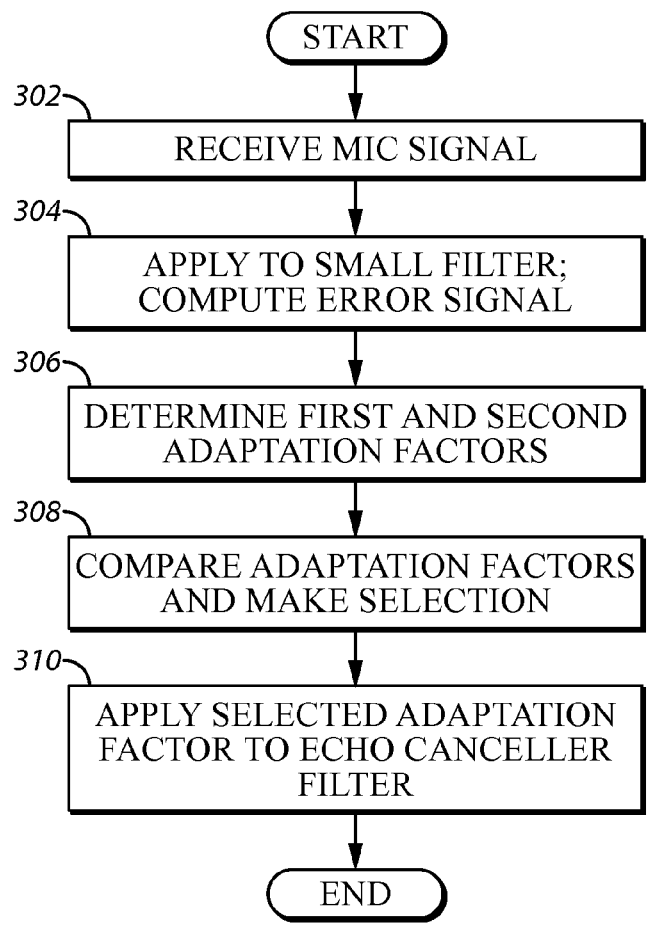
FIG. 3 comprises a flow chart of one approach for convergence control according to various embodiments of the present invention.

Referring now to FIG. 3, an approach of providing convergence control for an adaptive echo canceller filter for an echo canceller filter that has an adjustable convergence is described. At step 302 and regardless of the presence of echo or uplink speech, a microphone signal is received at a small filter and this small filter is functionally and/or physically separate from the adaptive echo canceller filter.

At step 304, the signal is applied to the small filter and an error signal is determined from the signal utilizing the small filter. The small filter continuously or almost continuously adapts the received signals.

At step 306, a first adaptation factor is determined based at least upon the error signal and the microphone signal according to a first signal analysis approach and a second adaptation factor is determined based at least upon the microphone signal according to a second signal analysis approach. In some aspects, the first adaptation factor is selected according to a microphone error cross correlation approach and the second adaptation factor is selected according to a normalized echo return loss approach. In some examples, the selecting comprises selecting the greater of the first magnitude or the second magnitude.

At step 308, the first adaption factor is compared to the second adaptation factor and one of the first adaptation factor or the second adaptation factor is selected based upon at least one predetermined criteria. For example, the comparing may involve comparing a first magnitude of the first adaption factor to a second magnitude of the second adaptation factor.

At step 310, the selected adaptation factor is applied to the echo canceller filer to control the convergence of the echo canceller filter. The applying the selected adaptation factor includes changing at least one filter coefficient of the adaptive echo canceller filter.

Figure 4:
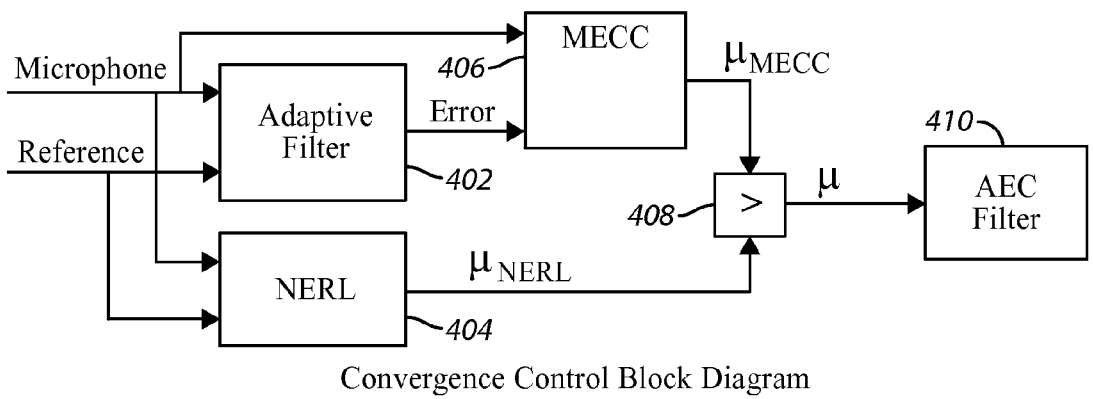
FIG. 4 comprises a block diagram of one example of a convergence control system according to various embodiments of the present invention.

Referring now to FIG. 4, a convergence control system includes a small adaptive filter 402, a Normalized Echo Return Loss (NERL) block 404, a Microphone Error Cross Correlation (MECC) block 406, a comparator 408, and an adaptive error control (AEC) filter 410.

In a typical echo canceller the adaptive filter is allowed to adapt only in the presence of echo and is explicitly held at a fixed state when uplink speech is present. This allows the filter to converge to the effects of the environment on the downlink speech using the echo, and prevents the filter from diverging in the presence of the uplink speech.

However, the small adaptive filter 402 of the present approaches is continuously or almost continuously adapting to the environment regardless of the presence of echo and/or uplink speech. And, due to the short length and large adaptation factor of this "free-running" filter the output of the filter 402 will always provide an unbiased indication of the state of the environment, e.g., echo or uplink speech.

In the presence of echo, only the error output will be small relative to the microphone input but in the presence of uplink speech or the absence of echo the error output will very nearly match the microphone input. Therefore, the error output of the free-running filter 402 is a good indicator of when there is sufficient echo energy for the filter to converge.

In one example, six signal and power estimates including microphone power, reference power, the expectation of the absolute value of the error signal times the microphone signal, the expectation of the absolute value of the error signal, the expectation of the absolute value of the microphone signal, and the expectation of the absolute value of the reference signal, are maintained for use by the MECC block 406 and NERL calculations in block 404 to generate an adaptation factor. Other factors may also be used.

The two calculations, in MECC block 406 and NERL block 404, are independent of each other and will generate two separate adaptation factors, which are then compared to each other by comparator 408. The largest factor is used by the echo canceller filter to properly adapt to the environment.

Figure 5:
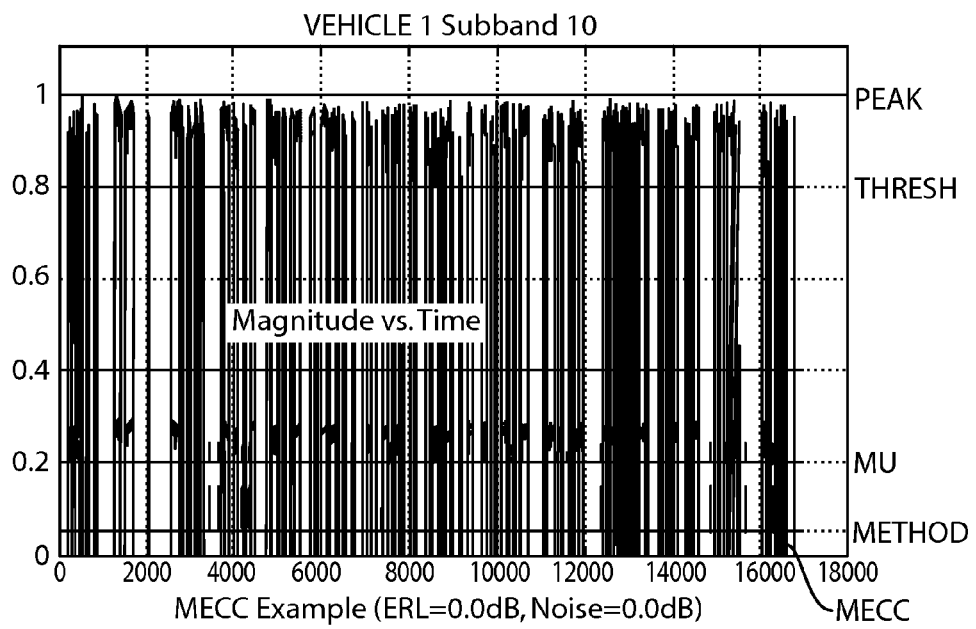
FIG. 5 comprises a graph showing aspects of convergence control according to various embodiments of the present invention.

The MECC block 406 determines an adaptation factor based on a simplified cross correlation calculation between the microphone signal and the error signal. This algorithm performs especially well in a good clean environment, i.e. when the Echo Return Loss (ERL) is in a normal range and the noise floor is not excessive. The MECC approach is most sensitive to the ERL of the environment and sometimes tend to breakdown as the ERL gets large, i.e. the echo energy gets small. This is shown graphically in FIG. 5 and FIG. 6. FIG. 5 shows strong convergence activity when the ERL is low (i.e., strong echo), however when the ERL is high (i.e., weak echo), as in FIG. 6, the convergence threshold is surpassed only very rarely.

The MECC block 406 calculates of the convergence factor from the error signal output of the free running filter and the microphone signal. First, the cross correlation term is estimated in one example using the following exponential recursive algorithm to estimate the expectation or mean of the magnitude of the error signal times the microphone signal. The exponential factor $\lambda$ defines an averaging window, e.g. 10 ms.

$$E[em](n) = \lambda E[em](n-1) + (1-\lambda)|em|$$

where: e=error output of the free-running filter and m=microphone signal.

Then, the microphone signal power is estimated in the same fashion.

$$E[mm](n)=\lambda E[mm](n-1)+(1-\lambda)mm$$

Given the two previous calculations, the MECC calculation for the convergence factor is:

$$MECC = 1 - \frac{E[em]}{E[mm]}$$

It can be seen from this formula that if the free running filter is converging well then the error signal (e) is approximately zero leading to an MECC result of approximately one. This translates to a high adaptation rate for the Acoustic Echo Canceller (AEC) filter 410. On the other hand, if the error output of the free running filter is high then either there is no echo to cancel or there exists doubletalk energy. In either case the strength of the error signal will be very close to the strength of the microphone signal and the MECC calculation will approach zero thereby translating to a low (or zero) adaptation rate.

Figure 7:
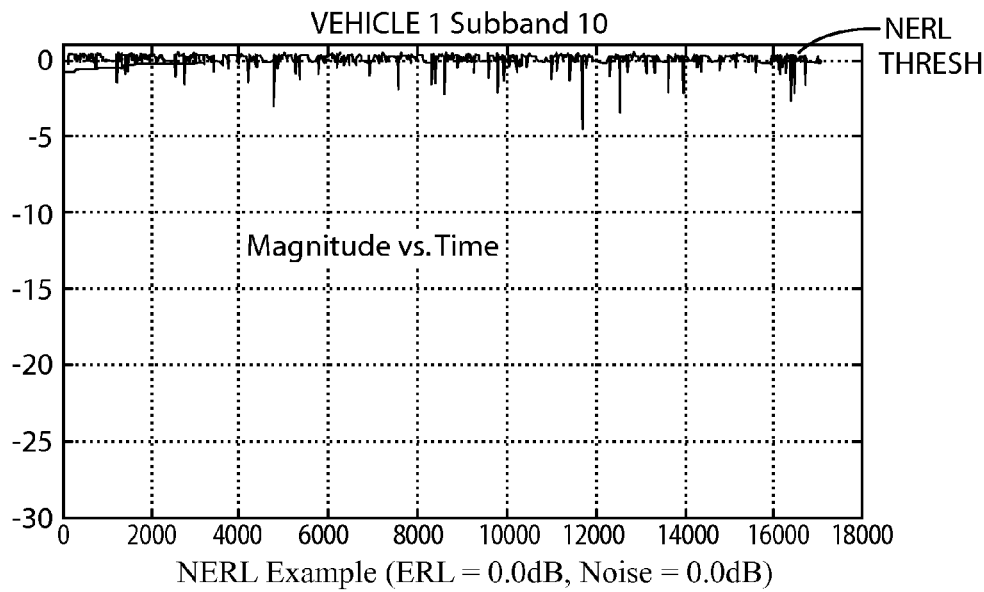
FIG. 7 comprises a graph showing aspects of convergence control according to various embodiments of the present invention.

The NERL block 404 first calculates a modified normalized ERL value and then performs a two dimensional linear interpolation of predefined table values to extract a convergence threshold. It then compares the normalized ERL value to that threshold and either sets the convergence factor to a fixed value if it is less than the threshold (typically 0.4) or clears it to disable convergence (freeze the filter) if it is greater than the threshold. This algorithm performs especially well when the quality of the environment degrades, i.e. high environmental noise and/or very high ERL values (very high ERL values provide little echo energy to the AEC filter 410 making it more difficult to converge properly). This is shown graphically in FIG. 7 and FIG. 8. FIG. 7 shows the performance of the NERL method under good environmental conditions which is obviously degraded when compared to the performance of the MECC under the same conditions. However, FIG. 8 indicates that the performance of the NERL under poor conditions is significantly improved over MECC.

The NERL block 404 first calculates the normalize ERL as shown in the following formula. This is not an ERL calculation since it uses the absolute value of the signals and not the power of the signals, but will be referred to in this text as such for simplicity.

$$NERL = \frac{E(m) - E(x)}{\sqrt{E(m)E(x)}}$$

In this formula E(m) and E(x) are the expectation values or mean of the absolute value of the microphone signal and reference signal respectively, and are calculated using a recursive algorithm as shown below.

$$E[m](n)=\lambda E[m](n-1)+(1-\lambda)|m|$$

$$E[x](n)=\lambda E[x](n-1)+(1-\lambda)|x|$$

The reference power and microphone power are also estimated in the same fashion as follows.

$$E[xx](n)=\lambda E[xx](n-1)+(1-\lambda)xx$$

$$E[mm](n)=\lambda E[mm](n-1)+(1-\lambda)mm$$

The normalized ERL is then modified with the ratio of the reference power to the microphone power as shown in the following equation.

$$NERL_M = NERL\sqrt{\frac{E[xx]}{E[mm]}}$$

The modification helps to keep the resulting value within a workable range so that it can easily be compared to a predetermined threshold.

The resulting modified NERL value is then compared to a convergence threshold to determine if the filter should be adapted or not. And, the convergence threshold is based on the quality of the environment.

In one aspect, the quality of the environment is defined by the current ERL measurement and the current ambient noise level. These two measurements are then used to extract a convergence threshold from a two dimensional array of predefined values (e.g., stored in a memory storage device). The adaptation factor is set to active if the NERL calculation is less than or equal to the convergence threshold and to zero if it is greater.

Figure 9:
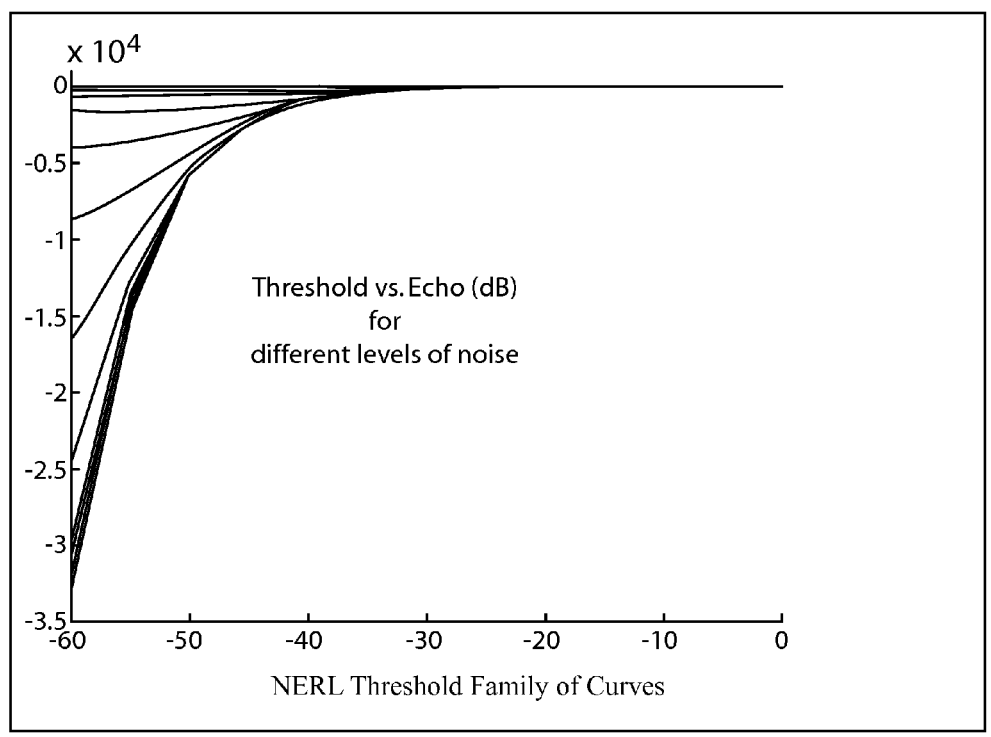
FIG. 9 comprises a NERL threshold family of curves according to various embodiments of the present invention.

The convergence thresholds are the expected or average NERL values for various levels of ambient noise and ERL measurements. In some approaches, they are generated using uniformly distributed random noise at various echo levels and various ambient noise levels. They can then stored in a two dimensional array as a family of curves representing the expected NERL threshold versus current echo level (ERL) with each curve representing the current ambient noise level as shown in FIG. 9. The threshold can then be extracted using a two dimensional linear interpolation between the points in the array.

The MECC block 406 provides accurate convergence control in a clean to moderately clean environment within a normal ERL range and the NERL provides accurate convergence control in a noisy environment with low echo energy (high ERL).

These two approaches used in combination with each other cover the dynamic range of the environment very well. The MECC block 406 covers the good quality environment while the NERL block 404 covers the low quality environment and the two methods overlap each other sufficiently to provide a smooth transition from one to the other. And finally, when these two methods are coupled with the unbiased free-running adaptive filter the convergence control will accurately follow the echo in a wide range of environmental conditions.

Figure 6:
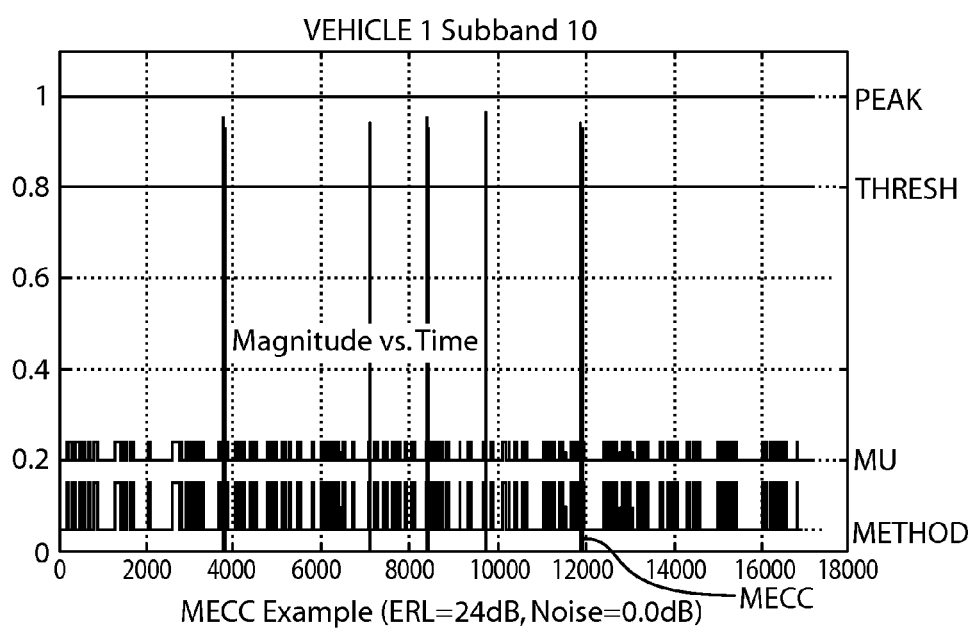
FIG. 6 comprises a graph showing aspects of convergence control according to various embodiments of the present invention.

Referring now to FIG. 5, a graph of convergence activity is described. As mentioned, the MECC approach is most sensitive to the ERL of the environment and sometimes tend to breakdown as the ERL gets large, i.e. the echo energy gets small. This is shown graphically in FIG. 5 and FIG. 6. FIG. 5 shows strong convergence activity (the convergence threshold is often exceeded) when the ERL is low (i.e., strong echo). Referring now to FIG. 6, when the ERL is high (i.e., weak echo), the convergence threshold is surpassed only very rarely indicating a low amount of convergence activity.

Figure 8:
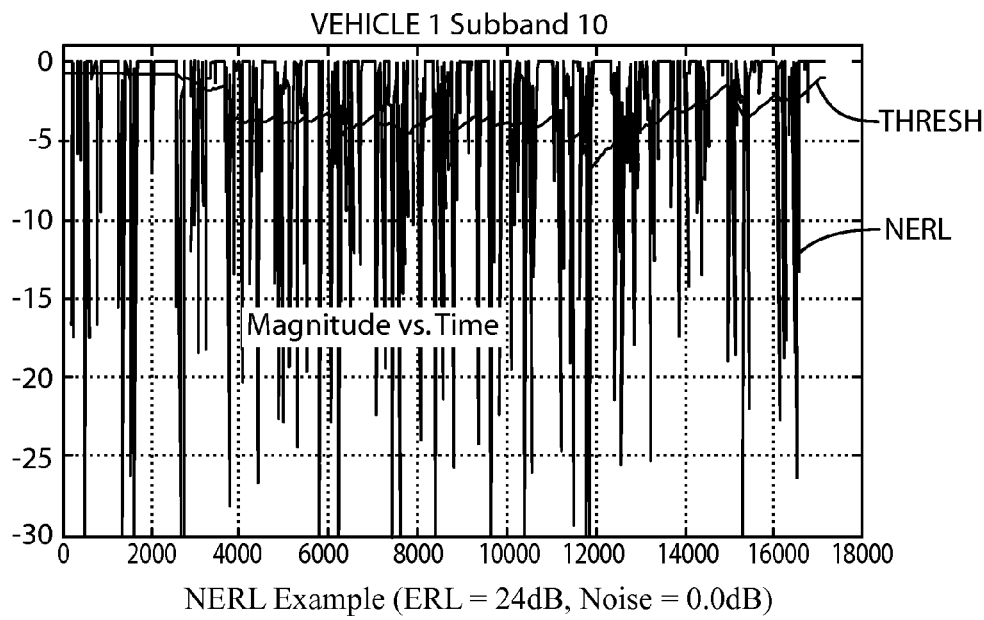
FIG. 8 comprises a graph showing aspects of convergence control according to various embodiments of the present invention.

Referring now to FIG. 7, the performance of the NERL method under good environmental conditions (which are degraded when compared to the performance of the MECC under the same conditions) is described. Referring now to FIG. 8, indicates that the performance of the NERL under poor conditions is significantly improved over MECC.

Referring now to FIG. 9, a NERL threshold family of curves is described. As mentioned, the convergence thresholds are the expected or average NERL values for various levels of ambient noise and ERL measurements. In one approach, these are generated using uniformly distributed random noise at various echo levels and various ambient noise levels and, in one example, are then stored in a two dimensional array as a family of curves representing the expected NERL threshold versus current echo level (ERL) with each curve representing the current ambient noise level. This information is used to build the two dimensional array of NERL threshold values (threshold of adapt versus do not adapt) based on the current ERL estimate and noise floor estimate. This improves the accuracy of the NERL algorithm over a wide range of environmental conditions.

It is understood that the implementation of other variations and modifications of the present invention and its various aspects will be apparent to those of ordinary skill in the art and that the present invention is not limited by the specific embodiments described. It is therefore contemplated to cover by the present invention any modifications, variations or equivalents that fall within the spirit and scope of the basic underlying principles disclosed and claimed herein.

What is claimed is:

1. A method of providing convergence control for an adaptive echo canceller filter, the echo canceller filter having an adjustable convergence, the method comprising:
   receiving a microphone signal at a small filter, the small filter being separate from the adaptive echo canceller filter;
   applying the signal to the small filter and determining an error signal from the signal utilizing the small filter, the small filter adapting received signals;
   determining a first adaptation factor based upon the error signal and the microphone signal, according to a first signal analysis approach and determining a second adaptation factor based at least upon the microphone signal according to a second signal analysis approach;
   comparing the first adaption factor to the second adaptation factor and selecting a greater one of the first adaptation factor and the second adaptation factor;
   applying the selected adaptation factor to the echo canceller filter to control the convergence of the echo canceller filter.

2. The method of claim 1 wherein applying the selected adaptation factor comprises changing at least one filter coefficient of the adaptive echo canceller filter.

3. The method of claim 1 wherein the first adaptation factor is selected according to a microphone error cross correlation approach and the second adaptation factor is selected according to a normalized echo return loss approach.

4. The method of claim 1 wherein the comparing comprises comparing a first magnitude of the first adaption factor to a second magnitude of the second adaptation factor.

5. The method of claim 4 wherein the selecting comprises selecting the greater of the first magnitude or the second magnitude.

6. The method of claim 1 wherein the echo canceller filter and the small filter are disposed within a vehicle to perform a vehicle application.

7. A control apparatus that is configured to provide convergence control for an adaptive echo canceller filter, the echo canceller filter having an adjustable convergence, the apparatus comprising:
   an interface including an input and an output, the input configured to receive a first adaptation factor, the first adaptation factor determined according to a first signal analysis approach and calculated at least in part using an error signal and a microphone signal, the input further configured to receive a second adaptation factor that is determined according to a second signal analysis approach based at least upon the microphone signal;
   a comparator coupled to the interface that is configured to compare the first adaption factor to the second adaptation factor and select a greater one of the first adaptation factor and the second adaptation factor;
   the comparator further configured to transmit the selected adaptation factor at the output to the echo canceller filter, the selected adaptation factor effective to control the convergence of the echo canceller filter.

8. The apparatus of claim 7 wherein the first adaptation factor is selected according to a microphone error cross correlation and the second adaptation factor is selected according to a normalized echo return loss.

9. The apparatus of claim 7 wherein the comparator is configured to compare a first magnitude of the first adaption factor to a second magnitude of the second adaptation factor.

10. The apparatus of claim 9 wherein the comparator is configured to select the greater of the first magnitude or the second magnitude.

11. The apparatus of claim 7 wherein the apparatus is disposed within a vehicle to perform a vehicle application.

12. A system of providing convergence control for an adaptive echo canceller filter, the system comprising:
   a small filter, the small filter configured to receive a microphone signal;
   an adaptive echo canceller filter, the echo canceller filter having an adjustable convergence;
   a control unit, the control unit coupled to the small filter and the adaptive echo canceller filter, the control unit configured to, determine an error signal from the received signal utilizing the small filter, the small filter adapting received signals, the control unit further configured to determine a first adaptation factor based upon the error signal and the microphone signal according to a first signal analysis approach and determine a second adaptation factor based upon the microphone signal according to a second signal analysis approach, the control unit further configured to compare the first adaption factor to the second adaptation factor and select a greater one of the first adaptation factor and the second adaptation factor based upon at least one predetermined criteria, the control unit configured to apply the selected adaptation factor to the echo canceller filter to control the convergence of the echo canceller filter.

13. The system of claim 12 wherein application of the selected adaptation factor is effective to change at least one filter coefficient of the adaptive echo canceller filter.

14. The system of claim 12 wherein the first adaptation factor is selected according to a microphone error cross correlation approach and the second adaptation factor is selected according to a normalized echo return loss approach.

15. The system of claim 12 wherein the control unit is configured to compare a first magnitude of the first adaption factor to a second magnitude of the second adaptation factor.

16. The system of claim 15 wherein the control unit is configured to select the greater of the first magnitude or the second magnitude.

17. The system of claim 12 wherein the echo canceller filter and the small filter are disposed within a vehicle to perform a vehicle application.

* * * * *